July 22, 1930.　　　　R. F. WEED　　　　1,770,959
EQUALIZED BRAKE
Filed May 19, 1927
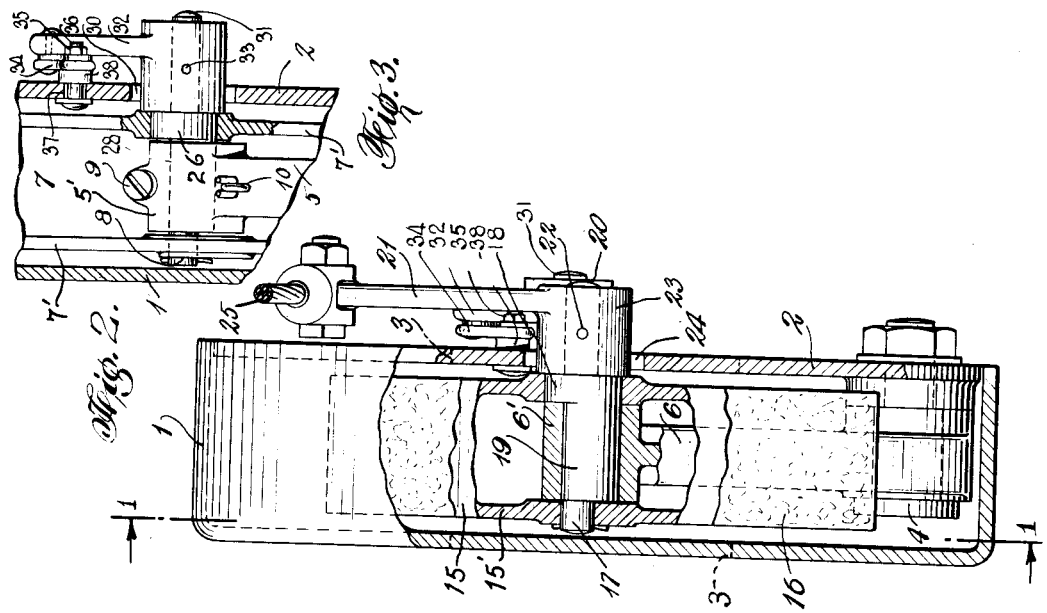
INVENTOR
Robert F. Weed
BY
Frederick S. Duncan, ATTORNEY Patented July 22, 1930

1,770,959

UNITED STATES PATENT OFFICE

ROBERT F. WEED, OF FAIRFIELD, CONNECTICUT

EQUALIZED BRAKE

Application filed May 19, 1927. Serial No. 192,553.

My invention relates to brakes and more specifically to brakes of the type adapted to be applied to vehicle wheels, although I do not limit my invention to such application.

An object of the present invention is to provide a brake by which a powerful braking action may be obtained with relatively small exertion of energy.

Another object of my invention is to provide a brake comprising a drum, and a pair of brake shoes adapted to bear respectively against opposite sides of the drum, the shoes being so inter-connected that in applying the brake one shoe, on being pressed against the drum, will serve as an abutment for forcing the other shoe against the drum.

Another object of my invention is to provide a very simple and readily accessible means for adjusting the shoes relative to the drum to compensate for wear, and for adjusting one shoe with respect to the other to compensate for unequal wear on the shoes.

With these and other objects in view my invention consists in certain novel features of construction and arrangements of parts which will be more fully hereinafter described and pointed out in the appended claims.

A preferred embodiment of my invention is illustrated in the accompanying drawings in which, Fig. 1 is a view in vertical section taken on the line 1—1 of Fig. 2, certain portions being broken away to illustrate details of construction;

Fig. 2 is an end view of my improved brake partly broken away to illustrate interior details; and Fig. 3 is a fragmentary view in section taken on the irregular line 3—3 of Fig. 1.

As shown in the drawings my improved brake mechanism is housed within a brake drum and is supported on a dust plate 2. The drum and the dust plate are formed with openings 3 through which may be passed the axle or hub of a wheel to which the brake is applied. In the lower portion of the plate 2 is mounted a stud 4 which serves as a fulcrum for a rigid frame or lever comprising a pair of integral or rigidly connected arms 5 and 6. These arms project upwardly and outwardly and serve to support a pair of opposed brake shoes. One of these brake shoes 7 is freely mounted on a pin 28 supported in a bearing 5′ in the free end of the arm 5. A spring 11 is secured under tension between an eye 10 on the arm 5 and a pin 12 fast in the plate 2. An adjustable stop 14 serves to limit movement of the arm 5 under impulse of the spring 11. The opposite brake shoe 15 is freely mounted on a pin 19 journaled in a bearing 6′ formed on the free end of the arm 6. The brake shoes 7 and 15 are each fitted with a suitable brake lining 16.

The pin 19 is formed on either side of the bearing 6′ with a pair of eccentric portions 17 and 18 respectively. These portions are mutually co-axial, but for convenience of construction and assembly, the portion 18 is made of larger diameter than the portion 17. The shoe 15 is preferably of channel form in cross-section being formed with a pair of spaced flanges 15′ which carry bearings to receive the portions 17 and 18. Because of this eccentric mounting the shoe 15 may be forced into engagement with the inner periphery of the drum 1 by turning the pin 19 in its bearing 6′. To effect this turning movement the pin is provided with an extension 20 which passes through an opening 24 in the plate 2 and carries an operating lever 21. The lever 21 is formed with a hub 23 which is mounted on the extension 20 and secured thereto by a pin 22 or any other suitable securing means. The free end of the lever 21 carries a suitable connection 25, such as a cable, by which it may be operated from a relatively remote point.

The parts are so arranged that by swinging the lever 21 toward the right, as viewed in Fig. 1, the pin 19 by reason of the eccentric mounting of the brake shoe 15, will cause the latter to move toward and seat against the inner periphery of the drum 1. As the shoe seats against the drum, further movement of the lever 21 will cause the arm 6 to swing inward or toward the left, as shown in Fig. 1, and, because the arm 5 is rigidly connected to arm 6, the shoe 7 will be moved against the periphery of the drum 1. In other words actuation of the lever 21 produces a relative movement between the shoe 15 and the arm 6, causing the latter to rock on the stud 4, and the shoe 7 is consequently forced against the opposite side of the drum. It will be understood that the opening 24 is made large enough to provide freedom of movement for the parts which pass therethrough.

In order to provide for relative adjustment of the brake shoes the shoe 7 is mounted on eccentric portions of the pin 28. These eccentric portions 8 and 26, as shown particularly in Figs. 3, are formed on opposite sides of the bearing 5', and for convenience of construction and assembly, the portion 26 is made of larger diameter than the portion 8, but the two portions are mutually co-axial. The shoe 7 like shoe 15 is formed with spaced flanges 7' having bearings therein to receive the portions 8 and 26 of the pin 28. By turning the pin 28 in its bearing 5' the shoe 7 may be adjusted toward or from the shoe 15.

The bearing 5' is preferably split and is provided with a clamping screw 9 by which the pin 28 may be clamped at any desired angular adjustment. However, in order to provide a more accessible adjusting means the pin 28 is not very tightly clamped in the bearing 5' and other means extending outside the brake drum is provided for adjusting the angular position of the pin 28. An extension 31 of the pin 28 passes through an opening 30 in the plate 2 and carries a crank arm 32. The latter is secured to the extension 31 by a pin 33 or other suitable means. The outer end of the crank arm 32 is freely connected by a link 34 to a sleeve 38 carried by a pin 36 which is adjustable in a slot 37 formed in the plate 2. The slot 37 is of arcuate form struck on the main axis of the pin 28. A nut 35 on the pin 36 serves to clamp the pin 36 and sleeve 38 at any desired adjustment along the slot 37. Whenever it is desired to adjust the position of the shoe 7 with respect to the arm 6 and hence with respect to the shoe 15 and the drum 1, it is merely necessary to loosen the nut 35 and turn the crank arm 32 through the desired angle after which the crank may be clamped in the adjusted position by tightening the nut 35. Owing to the link connection between the pin 36 and the crank arm 32, there will be no interference with the movement of the shoe 7 when the brake is operated by drawing on the connection 25. The opening 30 in the plate 2 is of sufficient diameter to provide freedom of movement for the parts passing therethrough when the brake is operated.

It will be understood that my invention is not limited to the specific embodiment described above and that I am at liberty to make such alterations, variations and modifications of construction and arrangements of parts as fall within the spirit and scope of my invention as defined in the appended claims.

I claim:

1. A brake comprising in combination, a brake member, a pair of opposed brake shoes for respectively engaging said member, a rigid frame pivotally connecting said shoes, and means for shifting one of said shoes relatively to the rigid frame to move both of said shoes into engagement with said member.

2. A brake comprising in combination, a brake member, a pair of opposed brake shoes for respectively engaging said member, a rigid frame connecting said shoes, and means for shifting one of said shoes relatively to the rigid frame to spread said shoes apart and into engagement with said member.

3. A brake comprising in combination, a pair of relatively movable members, one of said members presenting opposed braking surface portions, a rigid frame supported by the other of said members, a pair of opposed brake shoes carried by said rigid frame, and means for shifting one of said shoes relative to the rigid frame to spread the shoes apart and into engagement respectively with said surface portions.

4. A brake comprising in combination, a pair of relatively movable members, one of said members presenting a pair of opposed braking surface portions, a rigid frame fulcrumed on the other of said members, a pair of opposed brake shoes carried by said rigid frame, and means for shifting one of said shoes relative to the rigid frame to spread said shoes apart and into engagement respectively with said surface portions.

5. A brake comprising in combination, a relatively fixed member, a relatively movable member presenting a pair of opposed braking surface portions, a rigid frame fulcrumed on the fixed member, a pair of opposed brake shoes carried by said rigid frame, means for shifting one of said shoes relative to the rigid frame and against one of the braking surface portions as an abutment whereby the rigid frame will be rocked on its fulcrum carrying the other shoe into engagement with the other braking surface portion, and a spring adapted to return the rigid frame to normal position.

6. A brake comprising in combination, a relatively fixed member, a relatively movable member presenting a pair of opposed braking surface portions, a rigid frame fulcrumed on the fixed member, a pair of opposed brake shoes carried by said rigid frame, means for shifting one of said shoes relative to the rigid frame and against one of the braking surface portions as an abutment whereby the rigid frame will be rocked on its fulcrum carrying the other shoe into engagement with the other braking surface portion, a spring adapted to return the rigid frame to normal position, and a stop to limit movement of the rigid frame under impulse of the spring.

7. In combination, a brake drum, a relatively fixed support, a rigid frame fulcrumed on said support, a pair of opposed brake shoes carried by said rigid frame within the drum and adapted respectively to engage opposite sides of the inner periphery of the drum, means for shifting one of said shoes relative to the rigid frame into engagement with said drum whereby the drum will serve as an abutment for rocking the rigid frame on its fulcrum and pressing the other shoe into engagement with the opposite side of the drum.

8. In combination, a brake drum, a dust plate therefor, a rigid frame fulcrumed on the dust plate and within the drum, a pair of opposed brake shoes adapted respectively to engage the inner periphery of the drum, said shoes being carried by said rigid frame and one of said shoes being connected to the rigid frame by an eccentric pin, and means outside of the drum for rotating said pin to produce relative movement between the rigid frame and the shoe supported thereon whereby the brake shoes will be spread apart into engagement with the drum.

9. In combination, a brake drum, a dust plate therefor, a rigid frame fulcrumed on the dust plate and within the drum, a pair of opposed brake shoes carried by the rigid frame and adapted to be moved into engagement with the inner periphery of said drum on opposite sides thereof, means for adjusting one of said shoes relative to the rigid frame toward and from the drum, means for locking said shoe in adjusted position relative to the rigid frame, and means for shifting the other shoe relative to the rigid frame to spread said shoes into engagement with the drum.

10. In combination, a brake drum, a dust plate therefor, a rigid frame fulcrumed on the dust plate and within the drum, an adjustable stop carried by the plate, a spring urging said rigid frame against the stop, a pair of opposed brake shoes carried by the rigid frame and adapted to be moved into engagement with the inner periphery of said drum on opposite sides thereof, means for adjusting one of said shoes relative to the rigid frame toward and from the drum, means for locking said shoe in adjusted position relative to the rigid frame, and means for shifting the other shoe relative to the rigid frame to spread said shoes into engagement with the drum.

11. In combination, a brake drum, a relatively fixed support, a rigid frame fulcrumed intermediate its ends on said support, a pin journaled in each end of the rigid frame, each pin having an eccentric bearing surface, a brake shoe carried by each pin and mounted to oscillate on said eccentric bearing surface, a crank arm carried by each pin for turning said pins to move the shoes toward and from the drum, a link connected at one end to the free end of one of said crank arms and anchorage means adjustable on said fixed support for anchoring the other end of said link.

12. In combination, a brake drum, a dust plate therefor, a rigid frame fulcrumed intermediate its ends on said plate and within the drum, a pin journaled in each end of the rigid frame, the plate being formed with openings through which the pins project, each pin having an eccentric bearing surface, a brake shoe carried by each pin within the drum and mounted to oscillate on said eccentric bearing surface, a crank arm carried by each pin outside the drum, anchorage means adjustable on said plate, and a link freely connecting the free end of one of said crank arms to said anchorage means.

13. In combination, a brake drum, a dust plate therefor, a rigid frame fulcrumed intermediate its ends on said plate and within the drum, a pin journaled in each end of the rigid frame, the plate being formed with openings through which the pins project, each pin having an eccentric bearing surface, a brake shoe carried by each pin within the drum and mounted to oscillate on said eccentric bearing surface, a crank arm carried by each pin outside the drum, anchorage means adjustable on said plate, a link freely connecting the free end of one of said crank arms to said anchorage means, an adjustable stop on the inner face of the drum, and a spring adapted to hold the rigid frame normally in engagement with said stop.

In testimony whereof, I have signed this specification.

ROBERT F. WEED.